United States Patent [19]
Cannon

[11] 3,953,117
[45] Apr. 27, 1976

[54] SINGLE IMAGE PLANE TWO COLOR PHOTOCHROMIC DISPLAY TECHNIQUE

[75] Inventor: Berry A. Cannon, Toms River, N.J.

[73] Assignee: The United States of America as represented by the Secretary of the Army, Washington, D.C.

[22] Filed: June 10, 1975

[21] Appl. No.: 585,650

[52] U.S. Cl............................ 353/11; 340/173 LM; 340/173 CC; 350/160 P; 350/174; 353/31; 353/34; 353/36; 353/37; 353/82; 353/84; 353/120

[51] Int. Cl.[2]................ G03B 21/26; G11B 7/02; G02B 5/23; G02B 27/14

[58] Field of Search ............... 353/11, 30, 31, 34, 353/36, 37, 82, 84, 120, 121; 350/172, 174, 160 P; 340/173 LM, 173 CC

[56] References Cited
UNITED STATES PATENTS

| | | |
|---|---|---|
| 3,238,841 | 3/1966 | Bjelland et al. ................. 350/160 P |
| 3,454,414 | 7/1969 | Andes et al. .................. 340/173 LM |
| 3,676,591 | 7/1972 | Nix et al. .......................... 350/160 P |
| 3,706,487 | 12/1972 | LaForgia ............................. 353/11 |

*Primary Examiner*—Richard E. Aegerter
*Assistant Examiner*—Steven L. Stephan
*Attorney, Agent, or Firm*—Nathan Edelberg; Robert P. Gibson; Daniel Sharp

[57] ABSTRACT

A bi-color, single-image plane character display technique wherein the characters of two distinct colors are written by a scanned ultraviolet beam onto respective photochromic layers disposed on opposite sides of a film situated in the path of a projected light beam, which film is transparent to the light beam but opaque to the ultraviolet beam.

7 Claims, 2 Drawing Figures

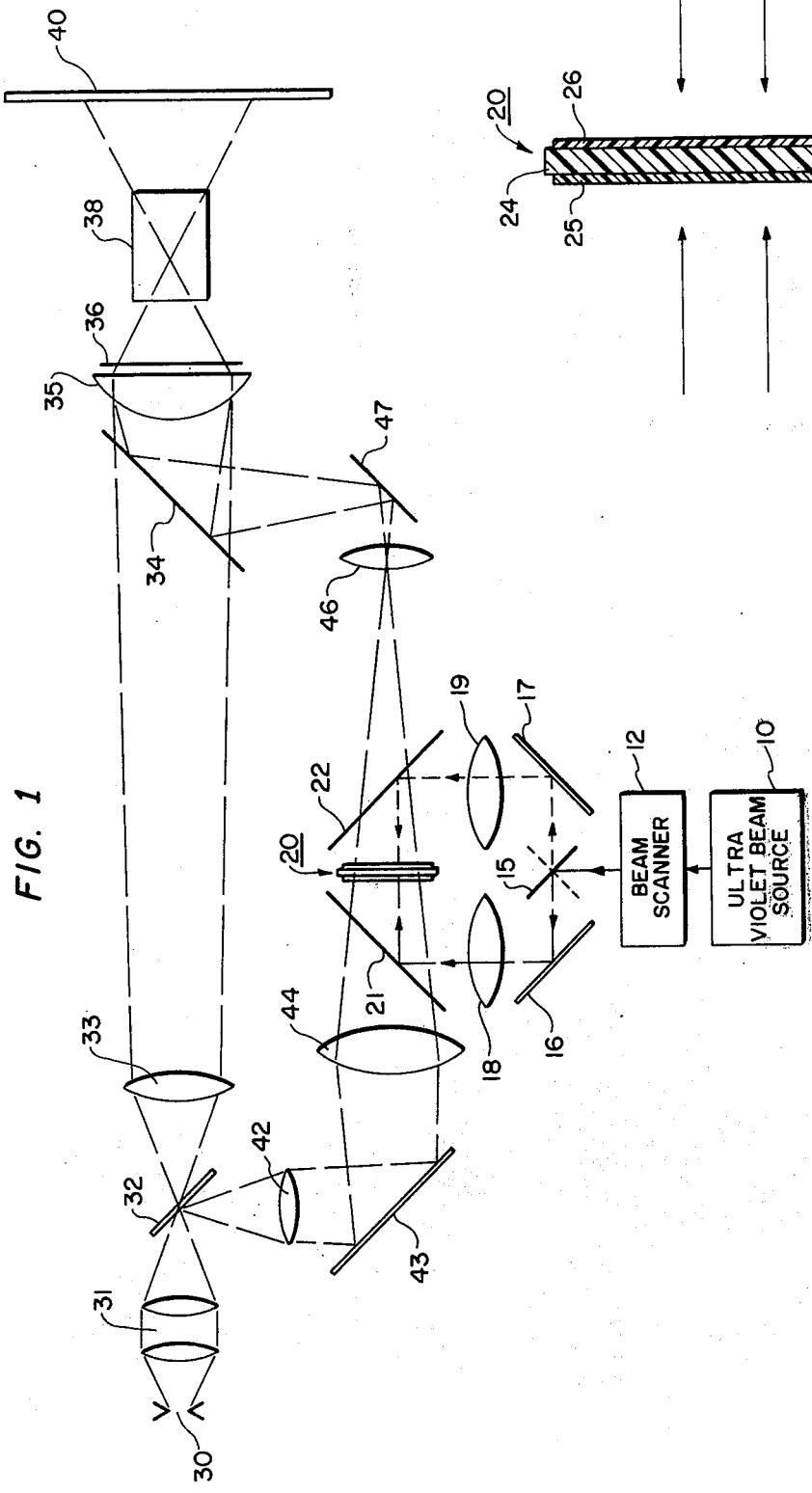
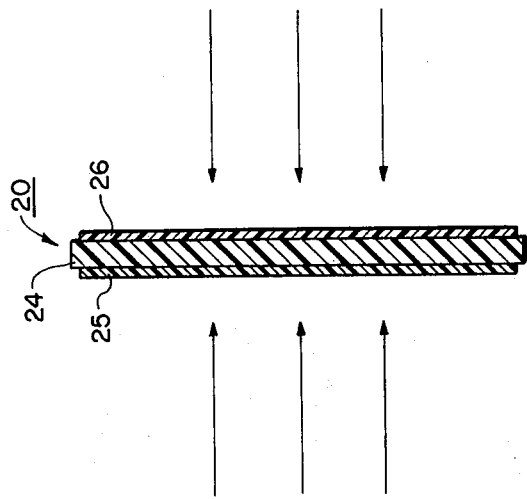
FIG. 1
FIG. 2

SINGLE IMAGE PLANE TWO COLOR PHOTOCHROMIC DISPLAY TECHNIQUE

BACKGROUND AND SUMMARY OF THE INVENTION

Photochromic display systems are known which are based upon the spectral energy absorption characteristics of certain photochromic materials. In such systems, the alpha-numeric characters or other elements of a scene are written as a photochromic image onto a photochromic film and are viewed on a screen simultaneously with details on a map slide. Such a system is described in U.S. Pat. No. 3,706,487 of S. F. La Forgia, issued Dec. 19, 1972.

Previously a suitable, convenient, large screen, dynamic real time color display has not been achieved. A real time display is desired which is capable of obtaining color images from a single frame of photochromic film, since multi-image plane techniques yield unsatisfactory displays. A typical prior art display uses laser writing techniques whereby friendly positions are represented by blue symbols having a border of a single line, while enemy positions are seen as blue symbols having a dual-line border.

In accordance with this invention, a large screen, dynamic real time, single image plane color display has been devised using a two-layered photochromic film technique such as will be described subsequently. Although this technique does not allow for a full color dynamic display, a two-color display has advantages, particularly in military applications which rely on the use of only four colors, viz., green, yellow, red, and blue. Green is used for man-made barriers and obstacles, both friendly and enemy, and yellow is used for areas of nuclear fallout or bacteriological contamination, both friendly and enemy. Since obstacles and contamination areas are written symbolically anyhow, little is gained by having them appear green and yellow, and, in fact, too many colors on an already congested military map could be confusing. Having the color blue for friendly personnel and red for enemy personnel, however, offers good differentiability so that commanders can more quickly and correctly assess the military situation and make more timely and accurate command and control decisions. Personnel using the display can readily distinguish enemy positions (red symbols) from friendly positions (blue symbols). A third color can be obtained by writing the same information in both red and blue, thereby yielding a magenta color. By permitting projection of two colors (blue and red), one does not require, as in the prior art display mentioned above, that part of a computer memory for double line enemy position symbol generation and storage. Consequently, friendly and enemy positions are much more easily distinguishable from one another.

The character information is written selectively onto either a blue photochromic layer on one side of the thin film or onto a red photochromic layer on the other side of the thin film. Information-carrying ultraviolet radiation is selectively directed over one of two paths, depending on which of two color symbols are to be written and projected. The ultraviolet light, upon reflection from a selected mirror, is made to impinge upon a corresponding one of two dichroic mirrors to reflect the ultraviolet light onto a corresponding one of the two photochromic layers, and thereby light either a red or a blue character on that selected photochromic layer. Simultaneously, one portion of a projection beam from a light source, after removal of any infrared and ultraviolet components therefrom, is transmitted through said corresponding dichroic mirror, the selected character bearing photochromic layer, the film and the other dichroic mirror. By suitable optics, the information is projected to the position of a transparent map overlay, and thence the map and dynamic characters are projected by means including a condensing lens and projection lens onto a viewing screen. In other words, as the color characters are being selectively written, they are simultaneously projected on this screen. The other portion of the projection beam from the optical source is transmitted through a separate lens system for recombination, just ahead of a condensing lens, with said one portion (character-containing portion) of the projection beam which passes through the selected photochromic layer.

In summary, a two-layer thin film can be written on from both sides, thus allowing two color symbols to be written in a substantially single image plane, while, at the same time that the colored symbols are being written, they are being projected onto a large screen for viewing, thereby providing a real time dynamic display. In addition, the two color technique of the invention has the added capability of ready incorporation into presently available monochromatic systems with far fewer problems then would be encountered when implementing techniques already used.

DESCRIPTION ON THE DRAWING

FIG. 1 is an optical diagram illustrating an embodiment of the two-layered photochromic film projection system of the invention; and FIG. 2 is a view illustrating the construction of the two-layered photochromic film.

BRIEF DESCRIPTION OF PREFERRED EMBODIMENT

Referring to the drawing, an optical symbol-writing beam is derived from an ultraviolet source 10, which by way of example, may be an argon laser having wave lengths of 363 nanometers and 351 nanometers. In normal practice, the laser beam is suitably deflected and scanned by controllable scanner 12 to produce desired characters or symbols. The character-shaped beam then impinges upon a mirror 15 which can be set in one of two alternative operative positions. The beam is reflected either to the left or to the right, depending upon whether the mirror 15 is oriented as shown in FIG. 1 by the solid line, or as shown by the dotted line, respectively. The ultraviolet writing beam then is reflected from either mirror 16 or 17, and then focused by either lens 18 or 19 onto the dichroic mirrors 21 or 22, all respectively. The optical system of FIG. 1 further includes a thin composite medium 20 including two photochromic layers. As shown in FIG. 2, the composite medium 20 includes a thin, ultraviolet-absorbing substrate 24 having one opposed surface coated with a blue photochromic layer 25 and the other opposed surface coated with a red photochromic layer 26. The substrate 24 can be a mylar film or tape of about 0.003 inch thickness capable of absorbing approximately 99% of the ultraviolet radiation of wave lengths below 390 nanometers. Since the wave lengths emitted by the ultraviolet argon laser used in the embodiment of FIG. 1 are 363nm and 351nm, the mylar film (substrate) 24 provides very good isolation of the two photochromic layers 25 and 26. Typical red and blue photochromic materials have absorption peaks at about 550nm and 600nm, respectively. A typical projection band from about 450nm (violet) to about 700nm (deep red) provides sufficient spectrum band coverage to achieve maximum color differentiability. The photochromic material is placed with a suitable binder such as Lexan in a solution of a solvent such as methylene dichlorids and applied to the film in the form of a very thin coating or layer of the order of 0.0005 inch thickness. The aforesaid solvent has no noticeable effect upon the mylar film; furthermore, the ultraviolet radiation of high energy density and short duration necessary for writing on a photochromic material does not affect the latter. Although red and blue colors are referred to for the respective photochromic layers 25 and 26, the invention, of course, is not limited to these colors inasmuch as other colors of photochromics are available. Blue and red are good choices for military applications however, since friendly units are usually signified by blue symbols and enemy units by red symbols.

The dichroic mirrors 21 and 22 reflect ultraviolet radiation and, for reasons to be explained later, are transparent to that portion of the optical spectrum to which the photochromic layers 25 and 26 are non-responsive, that is, light having wavelengths between 450nm and 700nm. Ultraviolet radiation impinging upon the layer 25 will cause those portions of the normally transparent layer 25 so impinged upon to turn blue. In like manner, ultraviolet radiation impinging upon an area of the layer 26 will cause that area to change from transparent to red. The mylar substrate 24 does not allow ultraviolet radiation impinging upon one photochromic layer to penetrate and strike the other photochromic layer. It will be noted that, with the arrangement shown in FIG. 1, a lateral (left-to-right) inversion of the characters in one of the channels is necessary in order to present them with the same orientation on both photochromic layers. This can be accomplished either by simple optics or electronically, for example, by inverting the horizontal deflection voltage on the laser deflection mechanism when this particular channel is used for writing.

The projection beam emanates from an optical radiation source 30, for example, an arc lamp, and is focused by condensing lens assembly 31 onto a dichroic filter 32 from which the projection beam is directed along two separate beam paths. The wavelength components of the optical spectrum emitted by the lamp 30 to which the photochromic layers 25 and 26 are sensitive are transmitted through dichroic filter 32, collimating lens 33, dichroic filter 34, condensing lens 35 and map overlay 36. An image of the map overlay is formed by means of projection lens assembly 38 upon the viewing screen 40.

The wavelength components of the optical spectrum emitted by the source 30 to which the photochromic layers 25 and 26 are insensitive, including the greater portion of the visible spectrum, are reflected by dichroic filters 32 and 34. This reflected radiation, after passing beam control lens 42, is reflected from front surface mirror 43 and focused by projection beam control lens 44 onto relay lens 46. The bean reflected from mirror 43 (visual components of the original source radiation) passes through the dichroic filters 21 and 22 and the photochromic film assembly 20; the information written onto the photochromic layers is "picked up" during the transmission of the reflected projection beam. The relay lens 46 projects the dynamic information to the map overlay 36, after reflection from front surface mirror 47 and the dichroic filter 34 recombines the separated projection beams to again form white light for projecting the map overlay 36 in true colors. The map overlay 36 may, for example, be a 70mm full color military map slide which contains various information concerning the military field of interest. The projection lens assembly 38 finally projects or transfers both the dynamic and static information onto the viewing screen 40.

The relay lens 46 must have a depth or field of at least the thickness of a substrate 24 plus the two photochromic layers 25 and 26. Since the substrate is about 0.003 inch thick and the two film layers together are about 0.001 inch thick, the relay lens should have a depth field of at least 0.004 inch. Because of the aforesaid dimensions, the red and blue characters appear to be in the same focal point and both colors can be projected substantially as though they were in the same plane.

Obviously many other modifications and variations of the present invention are possible in the light of the above teachings. It is to be understood, therefore, that, within the scope of the appended claims, the invention may be practiced otherwise than as specifically described.

What is claimed is:

1. A display system for projecting light from a broadband light source through an optically transparent information-bearing medium and onto a viewing screen comprising a thin film substrate transparent to visible radiation, a first photochromic layer disposed on one side of said thin film, a second photochromic layer disposed on the opposite side of said film, said photochromic layers being normally transparent to visible light, said first and second photochromic layers changing to mutually distinct colors in response to ultraviolet radiation,
   means for scanning a selected one of said two photochromic layers with ultraviolet radiation to write characters on said selected layer of the color corresponding to that layer,
   said layers and said film substrate being disposed in a path of said projected light whereby said characters appear on the viewing screen in conjunction with details of said information-bearing medium.

2. A display system according to claim 1 wherein the distinct colors for said first and second photochromic layers are red and blue, respectively.

3. A display system according to claim 1 wherein said film substrate is opaque to ultraviolet radiation.

4. A display system according to claim 1 wherein said layers and film substrate lies substantially in a single image plane.

5. A display system according to claim 1 wherein said ultraviolet radiation is produced by a laser.

6. A display system according to claim 1 further including means including a first dichroic filter for directing along said path radiation from said source to which said photochromic layers are insensitive and for transmitting along another path radiation from said source to which said photochromic layers are sensitive, and optical means for recombining said radiation transversing said paths into a single beam of visible radiation.

7. A display system according to claim 6 further including second and third dichroic filters transparent to the radiation directed along said path for reflecting said ultraviolet radiation onto corresponding ones of said photochromic layers.

* * * * *